Nov. 14, 1933.    W. TALLMADGE    1,935,166
HEATING SYSTEM AND REGULATING APPARATUS THEREFOR
Filed May 10, 1933    2 Sheets-Sheet 1
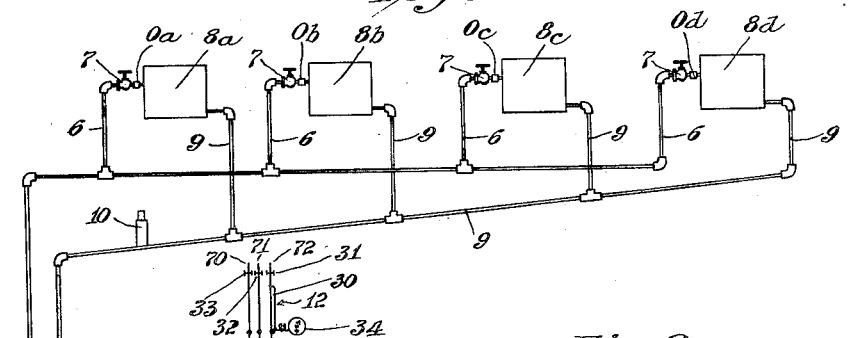
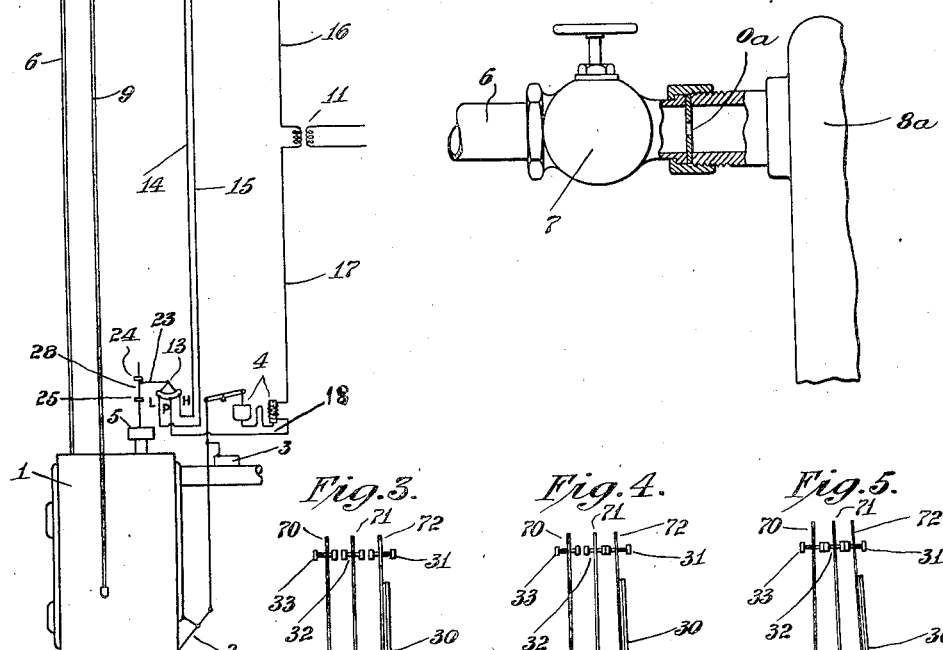
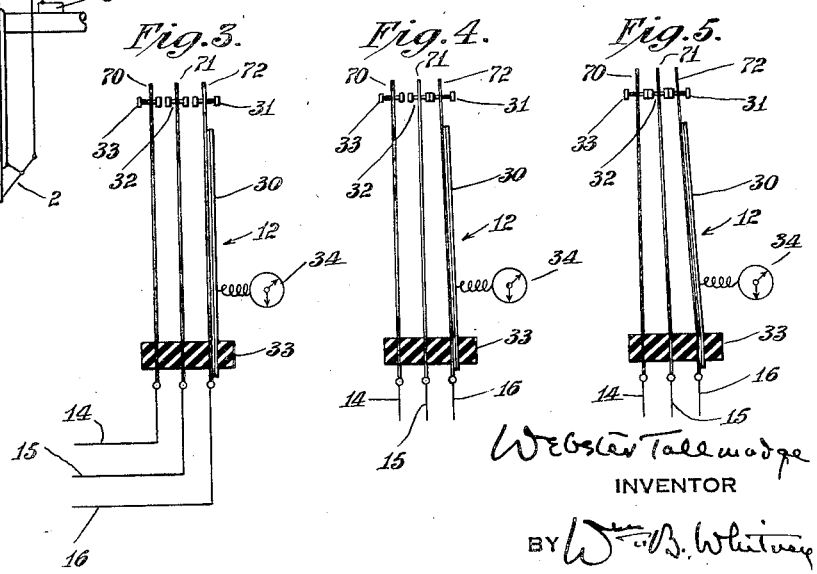

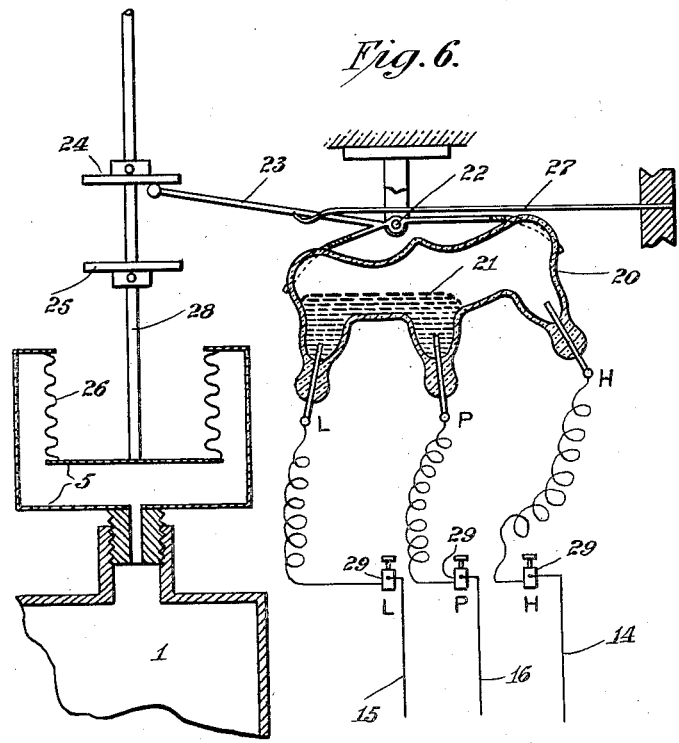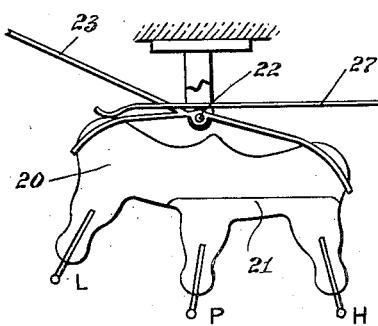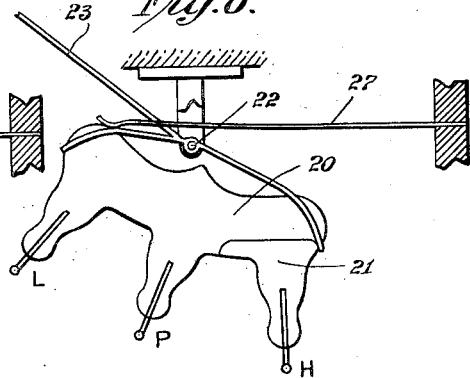

Patented Nov. 14, 1933

1,935,166

UNITED STATES PATENT OFFICE 1,935,166

HEATING SYSTEM AND REGULATING APPARATUS THEREFOR

Webster Tallmadge, Montclair, N. J.

Application May 10, 1933. Serial No. 670,237

7 Claims. (Cl. 236—9)

This invention relates to heating systems more particularly for buildings of small and medium size and especially buildings of the residential type and to apparatus for use in regulating such heating systems. The objects thereof are to provide a heating system that will give close regulation of temperature throughout the different parts of the building with a minimum consumption of fuel and steam, or other heating medium, and to avoid abrupt changes in temperature brought about by the operation of the regulating system. A further object of this invention is to provide a cheap and efficient device or group of devices for bringing about a desirable uniform and efficient temperature regulation.

According to present day practice, the heating systems of small and medium size buildings and particularly those of the residential type comprise a furnace and boiler, the latter usually equipped with safety valve, water level indicator, pressure gauge, and other standard accessories, and radiators which may be provided with air valves and steam traps and are connected with the boiler by steam and return piping; and the regulation thereof is accomplished by actuating the damper on the ash-pit and the check-draft in the smoke-pipe of the furnace and boiler by means of pressure-responsive devices and weights and/or motors or vapor-pressure devices controlled by a thermostat which is placed at a given point in the building and is generally provided with a clock by means of which one temperature setting may be used for the waking hours and another for the sleeping hours and also with an adjustment by means of which the waking hour temperature setting may be varied at will. In addition, an independent pressure limit control is frequently provided.

Such systems have many inherent faults which result in unequal heating of different parts of the building, in uneconomical use of steam or other heating medium, and, particularly in installations using copper radiators of light weight and consequent low heat-holding capacity, in intermittent application of steam or other heating medium, to the system with resultant sudden variations in temperature.

For example, assuming that the building has been at a low temperature over night and the thermostat has just been thrown to the waking hour temperature setting, the motor or other device operates the ash-pit damper and smoke-pipe check-draft so that full air supply and full draft are supplied to the furnace, and consequently the fuel burns more rapidly so that the steam pressure rises and the steam flow to the radiators increases. The radiator nearest to the boiler receives steam more quickly than the radiator farthest therefrom with the result that the former heats up before the latter. In many installations, this effect is so pronounced that the rooms heated by the radiators farthest from the boiler are not only slower in heating up in the morning but are often insufficiently or spasmodically heated at all times. As explained, the control of the system is through the air supply to the fuel in the furnace, and the "full-on" or "all-off" type of regulation provided by the thermostat and motor or other operating device causes the above cycle to be repeated whenever the thermostat operates. With radiators of intermediate position, intermediately unsatisfactory heating will be obtained. The effect just described is particularly noticeable when the thermostat is so placed in the building that it is influenced by the heating of a radiator fed from a point near the boiler. If, however, the thermostat is located at a place where it is influenced by the heating of a radiator fed from a point far from the boiler, a different condition obtains. In this case the ash-pit damper and smoke-pipe check-draft will give full air supply with resultant increased fuel consumption until such far radiator heats its part of the building to the temperature required to operate the thermostat, to effect the closing of the ash-pit damper and the opening of the smoke-pipe check-draft, the radiators fed from points nearer to the boiler having received too much steam with resultant overheating in the rooms in which they are located and the wasting of steam. Furthermore, in contrast with the older type of cast-iron radiators, which had considerable weight and resultant high heat-holding capacity and which therefore tended to smooth out the adverse effects of the full-on and all-off type of control, the newer type of light metal radiators of copper, etc., as exemplified by the convection type, have a very low heat-holding capacity and the full-on and all-off type of control gives intermittent and unsatisfactory heating with frequent sudden variations in room temperature as well as frequent operation of the thermostat system.

I have obviated all of the above defects by my present invention which consists, broadly stated, of a heating system( for the purpose of simplification described as a steam heating system), each radiator of which is provided with a metering orifice of size proportioned to the size of the radiator in such manner that an amount of steam equal to the full condensing capacity of the radiator, at say 70° room temperature, will flow through the orifice when an upper steam pressure "X" is applied at the orifice, and an amount of steam equal to a definite fraction thereof, say 25 percent, will flow through the orifice when a lower steam pressure "Y" is applied at the orifice, together with a plural control thermostat which is operatively connected with the motor used to actuate the ash-pit damper and smoke-pipe check-draft through a multiple point contactor which in turn is controlled by the steam pressure in the boiler and in such a way that pressures in the neighborhood of the upper steam pressure "X" are maintained on the boiler and supply piping, when heat is to be supplied to the building at a high rate, pressures in the neighborhood of the lower steam pressure "Y" are maintained on the boiler and supply piping, when heat is to be supplied to the building at a low rate, and pressures intermediate "X" and "Y" when, if desired, heat is to be supplied to the building at intermediate rates.

By means of my invention, when the building is being heated from a lower to a higher temperature, for example, when the thermostat throws-on in the morning, the radiators far from the boiler and those near to it are all supplied with steam at the same time and in amounts corresponding to their respective condensing capacities, so that remote rooms are heated as satisfactorily as nearby rooms, and at the same time. Whether the thermostat is placed at a point heated by a near radiator or at a point heated by a far radiator, neither near radiators nor far radiators are favored in the matter of steam supply or temperature control with the result that overheating is avoided, fuel is saved, and uniform temperature regulation of the entire building is obtained. In an installation provided with radators of light metal construction and consequent low heat-holding capacity, the sudden changes in room temperature which occur with the full-on and all-off type of regulation are avoided, and uniform temperature control is obtained.

In accordance with the well known principle of the flow of fluids, the amount of steam which will flow through an orifice under a given pressure difference is represented by, among others, the simple formula:

$$Q = K \sqrt{P_1 - P_2}$$

in which Q is the quantity of steam flowing in unit time, $P_1$ is the pressure before the orifice, $P_2$ is the pressure after the orifice, $(P_1-P_2)$ is the pressure difference across the orifice and K is a constant depending on the area, shape, and form of the orifice and other factors; that is to say, if a radiator orifice is of such size and form that will permit an amount of steam equal to the full (100%) condensing capacity, at approximately 70° room temperature, of a given radiator to flow through it with a steam supply pressure of, for example, 16 oz. and 0 oz. return pipe pressure, the pressure required for one-quarter (25%) flow is $$(\sqrt{16} \div 4)^2 = 1 \text{ oz.}$$

Accordingly, if a heating system for small or medium size buildings, including residences, is provided with orifices of such respective sizes at each radiator, so that with, for example, 16 oz. of steam pressure in the supply pipe and 0 oz. return pipe pressure, respective amounts of steam just equal to the full condensing capacity at approximately 70° room temperature of each respective radiator would flow through the orifices, then such a system would permit an amount of steam approximately equal to 25% of such full condensing capacity of each respective radiator to flow at 1 oz. pressure in the supply pipe and 0 oz. pressure in the return pipe. A heating system so equipped is provided, according to my definition, with metering orifices. For any intermediate pressure the steam taken by each respective radiator in the system is the same percentage of its full condensing capacity which the square root of the pressure would indicate, in accordance with the above formula, and at times of change, the percentage of heating input, either increase or decrease, is the same for each radiator of the system whether it be a near or a far radiator, provided the supply piping is of such size that the pressure drop in it is but a small percentage of the operating pressure. In most small and medium size building and residence heating systems, the usual piping is of such size that this condition prevails.

By my invention the thermostat system instead of operating as a full-on and all-off system, as in the usual practice, operates by supplying steam to the supply piping at two or more pressures, a high pressure say of 16 oz., automatically in use under conditions of high heat load, a low pressure say of 1 oz. automatically in use under conditions of low heat load, and one or more intermediate pressures, if desired. This feature of my system, which can be applied to most, if not all, of the present commercial regulating systems with few and inexpensive changes, is of particular value in maintaining uniform temperature in installations where light weight low heat-holding capacity radiators are used and permits the minimum amount of heat to be delivered for maintaining any given desired temperature and hence gives the maximum fuel economy.

The invention and the manner in which it operates will be understood by reference to the accompanying drawings, in which—

Figure 1 is a diagrammatic view of a residence heating system, illustrating one practical embodiment of the invention; Fig. 2 is an enlarged detail showing, partly in elevation and partly in section, one of the radiator valves and the adjacent section of piping with inlet orifice-disk in place therein; Figs. 3, 4 and 5 are enlarged details respectively showing, more or less diagrammatically and partly in elevation and partly in section, the elements of the thermostat in each of their different operative positions; Fig. 6 is an enlarged detail showing, also more or less diagrammatically and partly in elevation and partly in section, the mercury contactor, in one of its operative positions, and the associated pressure responsive device; and Figs. 7 and 8 are views of the mercury contactor similar to Fig. 6 but respectively showing it in each of its two other operative positions.

As therein shown, 1 indicates the boiler and furnace, with its ash-pit damper 2 and smoke-pipe check-draft 3; 4 is the actuating motor for damper 2 and check-draft 3; 5 is a pressure sensitive device connected with and responsive to the pressure of the steam within the boiler, the operation of which will be hereinafter described; 6 is the steam piping connecting the boiler, through radiator valves 7 and special metering orifices $O^a$, $O^b$, $O^c$ and $O^d$, to a plurality of radiators $8^a$, $8^b$, $8^c$ and $8^d$; and 9 is the return piping, provided with air outlet 10, connecting the radiators back to the boiler.

With the exception of the metering orifices at the radiators, a feature which has already been briefly described and which constitutes subject-matter of an earlier application filed by me on November 29, 1929, Serial No. 410,513, all of the apparatus thus far indicated is of standard or any suitable type and may be equipped with such additional accessories as may be found desirable. The motor 4, which actuates the damper 2 and the check-draft 3, may be of any one of a number of different types but is here shown, by way of illustration, as a vapor-tension motor, heretofore used for the same purpose, in which an electrical heating element is thermally associated with a chamber containing a volatile liquid and connected by a tube to a pressure sensitive bellows in turn so operatively connected through levers with the damper and check-draft that the former will be open and the latter closed when the motor is energized and moves to what may be designated as its heat-on position, serving a full supply of air to the fuel in the furnace. On the de-energization of the motor, a spring acting on the bellows causes it to move in the opposite direction, to close the damper and open the check-draft, the motor being then in heat-off position. The pressure sensitive device 5 is also of the usual spring bellows type commonly employed in steam heating work, consisting of a chamber closed on top by a spring bellows 26 (with or without supplemental spring) and in direct communication with the steam in the steam chamber 1.

But as heretofore used, the heating element of the motor has been connected with a suitable source of electric current by a circuit under the control of a thermostat, and the clock usually associated therewith, which merely makes and breaks the circuit therethrough to effect what has been described as the full-on and all-off type of regulation, and the pressure sensitive spring bellows, as used therewith, has served merely to actuate the levers and moves the damper and check-draft to all-off position, independently of the motor, on a rise of the steam pressure within the boiler above a predetermined value; whereas, according to my invention, the motor 4 is operated by electric current from a suitable source, as the small transformer 11, over circuits including the conductor wires 14, 15, 16, 17 and 18 and controlled jointly by what may be designated as a dual-control thermostat 12 and a triple-point mercury contactor 13, the latter in turn controlled by the pressure responsive device 5, all as presently to be described.

The thermostat 12 has, as shown, three spring contact-fingers 72, 71 and 70 which at one end are set through and supported by a plate of insulating material and at the other or free end carry, respectively, contact 31 adjustably mounted on a threaded post, double contacts 32, and contact 33 also adjustably mounted on a threaded post; and attached to the outer face of contact-finger 72 and forming a part thereof is the usual bimetallic thermostatic element 30 so arranged that on cooling it bends to the left and on heating bends to the right. The clock 34 serves, as usual, to vary the tension on the thermostatic element 30 to thereby shift it from normal day-time to predetermined night-time temperature setting, and vice versa. The arrangement and adjustments of the various elements are such that, with a day-time setting and a temperature of 72°, for example, the contact fingers of the thermostat are in the relative positions shown in Fig. 3, with both sets of contacts open. If the temperature drops say one degree, to 71°, contact-finger 72 is bent to the left to an extent sufficient to close contact 31 against the cooperating contact 32 of contact-finger 71, thereby electrically connecting these two contact-fingers—a condition shown in Fig. 4. And on a further drop of the temperature, say to 70°, the contact-finger 72 will be bent further to the left and, through the abutting closed contacts 31 and 32, will cause contact-finger 71 to bend to the left to close its second contact 32 against contact 33 of contact-finger 70, thereby establishing electric contact between all three contact-fingers, as shown in Fig. 5.

The contactor 13 consists of a glass capsule 20, which contains a small body of mercury 21 and into which are sealed three contact-terminals L, P and H electrically connected to the elements of the thermostat—terminal L to contact-finger 71 through binding post 29L and thence by wire 15, terminal H to contact-finger 70 through binding post 29H and thence by wire 14, and terminal P to contact-finger 72 through binding post 29P and thence by wires 18, 17 and 16 and the heating coil of motor 4 and the secondary of the transformer 11. The contactor is suitably supported from a pivot 22, bearing in two spaced posts, and is so shaped and balanced on its supporting pivot that it tends normally to assume the position shown in Fig. 7, in which the mercury electrically connects its two contact-terminals P and H. It also carries rigidly attached thereto an arm 23 which extends outwardly therefrom and terminates in a bearing head between two adjusting members 24 and 25 adjustably mounted on a rod 28 carried by the spring bellows 26 of the pressure responsive device 5, which adjusting members are caused to move upwardly and downwardly by the movement of the bellows on variations in the pressure of the steam within the boiler and to an extent directly proportional to such steam pressure variations and by their movement control the position of the contactor. The parts are so co-ordinated and adjusted that with a low pressure of steam in the boiler and heating system, 1 oz. for example, the low pressure adjusting member 24 bears down on the arm 23 and, swinging the contactor to the right, tilts it to the position shown in Fig. 6, which may be designated as its low pressure range position, where the mercury electrically connects its contact-terminals L and P. On a rise of pressure the adjusting member 24 is moved upwardly and disengages the arm 23, whereupon the contactor swings back to its normal or high pressure range position, shown as already stated in Fig. 7, in which the mercury electrically connects its contact-terminals P and H and thereby establishes a condition which continues to exist so long as the heating system continues to be operated within the limit of its high range of steam pressure, around 16 ozs. for example. And on a further rise in the steam pressure, say to 18 ozs., the high pressure adjusting member 25 is raised into engagement with the arm 23 and swings the contactor to the left, thereby tilting it to what may be designated at its high pressure position, shown in Fig. 8, where the mercury is in electrical contact only with its contact-terminal H; and in so doing it puts under tension the spring 27, which serves, when the steam pressure drops and the arm 23 is released, to overcome the tendency of the contactor to remain in this position because of the weight of the mercury concentrated at its extreme end.

The operation of the complete heating system and its regulating apparatus is as follows: Assume that the building is cooled to night-time temperature, the thermostat clock has just been thrown on to the day-time position, and the steam pressure on the boiler is low, say, for example, 1 oz. The thermostat is then in the condition shown in Fig. 5, its contact-fingers all being in electrical contact; the contactor 13 is in the position shown in Fig. 6, with contact-terminals L and F electrically connected; and a circuit through the coil of the motor 4 is completed from the source of electrical current by wire 16, contact-fingers 72 and 71, wire 15, contact-terminals L and P, and wire 18 to the motor 4 and thence back by wire 17 to the current source, causing the motor to operate to move the damper and check-draft to heat-on position, and the combustion of the fuel causes the steam pressure on the system to rise. At some point between 1 and 16 ozs. of steam pressure, 2 oz., for example, the contactor 13 is released and shifts to the position shown in Fig. 7, so that its contact-terminals P and H are electrically connected. Under this condition, until the building is warmed to a temperature above 70°, the energization and consequent heat-on position of the motor 4 is maintained by current over the circuit established by wire 16, contact-finger 72, contacts 31, 32 and 33, contact finger 70, wire 14, contact-terminals H and P, and wire 18 to the motor and thence by wire 17 to the current source. Combustion continues in the boiler and the pressure on the system will rise to 16 ozs. As previously explained, by reason of the orifices $O^a$, $O^b$, $O^c$ and $O^d$, heat is supplied to every radiator in the system at the same time and in exact proportion to the condensing capacities of the respective radiators during this interval. If, now, the steam pressure continues to rise and exceeds 16 ozs., approaching 18 ozs., for example, the contactor 13 will be rocked by the high pressure adjusting member 25 to the position shown in Fig. 8, in which position the circuit will be broken between contact-terminals P and H, the motor 4 will be de-energized and move to heat-off position, and combustion will be checked. In this way, my regulating system acts as a pressure-limit control, thus preventing excess steam pressure developing in the boiler even though the building may not be yet up to the temperature setting of the thermostat. The same limit control action will apply if electric faults should develop in the electric circuit or if the current supply should be interrupted. Hence, the addition of the usual separate pressure-limit control on the boiler is made unnecessary since my device, in its design, fully accomplishes this function.

Assuming that the 16 oz. pressure is being maintained on the heating system and the building temperature slightly exceeds 70°, the contact between contact-fingers 70 and 71 of the thermostat will be broken and the motor 4 will be de-energized and move to heat-off position, with the result that combustion is checked and the steam pressure on the heating system begins to fall. By the time this pressure has fallen to approximately 2 ozs., the contactor 13 will have been shifted to the position shown in Fig. 6 and if the temperature at that time is somewhere between 70° and 71°, the motor 4 will again be energized, and moved to heat-on position, by current over the circuit established by wire 16, contact-fingers 72 and 71, wire 15, contact-terminals P and L, wire 18, coil of motor 4, and wire 17 back to the current source. As previously explained, with my steam distribution system, this low steam pressure will serve to maintain a partial heating of the radiators, slightly in excess of 25 percent., uniformly for all the radiators in the heating system. The advantage of this effect in installations using light weight radiators of low heat-holding capacities, has already been explained.

If, now, the temperature in the building even under such rate of heat supply continues to rise to a point between 71° and 72°, the connection between contact-fingers 71 and 72 will be broken and the motor 4 will be deenergized and move to heat-off position and there remain until the temperature has fallen to 71°, whereupon the 1 to 2 ozs. steam pressure supplying slightly in excess of 25 percent. heat input to all the radiators in the system will again automatically become operative.

If because of a lowering of outside temperature a further cooling of the building occurs, such that its temperature falls to between 70° and 71°, the application of such approximate 25 percent. heat delivery will continue, but when the building temperature falls just below 70° an electric circuit through the coil of motor 4 will be established by contact-finger 70, contacts 33, 32 and 31, and contact-finger 72, and the motor will be energized and moved to heat-on position and there remain until the steam pressure is raised to the 16 ozs. which give the 100 percent. heat delivery. When the temperature of the thermostat is warmed up to a point above 70°, the circuit through the coil of the motor 4 will be broken and the motor will be de-energized and move to heat-off position. When the temperature at the thermostat is between 70° and 71° the steam pressure on the heating system will again move to the 1 to 2 oz. pressure giving the approximately 25 percent. heat delivery, and the cycle as above described will continue in accordance with the various room temperatures which occur from time to time.

It is thus seen that by my invention the objections to a full-on and all-off heat control are obviated and that a close and uniform regulation of temperature throughout the different parts of a building is obtained, that abrupt changes in temperature even with the new light-weight type of radiators are avoided, and that a minimum consumption of steam for any desired heating temperature is obtained.

While I have described my invention with respect to the three specific temperatures, 70°, 71° and 72°, it is to be understood that these are merely illustrative and that the temperature interval between contact-finger settings may be varied at will even to as low a point as a small fraction of one degree for each or either of the two temperature intervals. Furthermore, by constructing the thermostat in accordance with standard practice in the heating art, this setting may be adjusted at will so that the predetermined building temperature to be maintained, instead of being 70°, may be any other temperature desired, consistent with normal heating practice. My invention has also been described in connection with the use of a vapor-pressure operated motor, but it is to be understood that electromagnetic motors, gravity motors, air, oil, or water motors, or any other type of power may be used, provided the control of the application of the force of the motor is made in accordance with my invention as described herein.

I have also described my invention with respect to a high pressure of 16 ozs., stating that the orifices used at the radiators are so sized as to give 100 percent. steam input at 16 ozs. steam pressure and 0 oz. back pressure and, in the example, have shown that a pressure of 1 oz. with 0 oz. back pressure will result in a 25 percent. heating of each of the radiators. It is not my intention to limit my invention to these two control pressures, they merely being given to illustrate my invention, and it is intended that both the low control pressure and the high control pressure of my invention will be selected with particular thought to accomplishing the purposes thereof in its various desired applications.

I have also described my invention in its application to a coal-fired furnace and boiler, but it is not my intention to limit myself to such type of boiler since, as will be apparent to anyone skilled in the art, the invention is equally applicable to gas-fired boilers, oil-fired boilers, or to heating from a central steam supply, or to hot-air or hot-water heating systems, with obvious slight apparatus modifications, such as the addition to the bellows 5, shown in Figs. 1 and 3 as steam-actuated, of a sealed chamber, connected to the bellows and in thermal contact with the heating medium, containing a volatile liquid or expanding liquid of such characteristics that the temperature of the hot air in a hot-air system, or of the hot water in a hot-water system, produces the movements hereinabove described of the triple-terminal contactor 13. In any of such applications the motor control is applied to the appropriate point in the heating system and the triple-terminal contactor, actuated as above described, is connected to the steam supply or other heating medium feeding the heating system of the building.

While I have described the triple-point contactor as a mercury contact device, I do not limit my invention to contactors of that type but wish to include other metallic contactors or other types of electric devices for making or breaking electric circuits which accomplish the purpose hereinabove described.

All temperatures herein specified are in degrees Fahrenheit, and all references to pressures are to gauge pressures.

Having now particularly described the nature of such invention and the manner in which it is to be carried out, what I now claim as new and desire to secure by Letters Patent is:—

1. In a heating system of the type described, the combination, with a source of supply of a heating medium and a plurality of radiators connected by piping therewith, of a motor controlling the amount of the heating medium supplied to the radiators, and control means for said motor comprising electric circuits, a thermostat having at least two sets of contacts and a contactor having at least three contact-terminals jointly controlling said electric circuits, and a device responsive to variations in the heating medium supplied to the radiators controlling said contactor.

2. In a heating system of the type described, the combination, with a source of supply of a heating medium and a plurality of radiators connected by piping therewith, of a motor controlling the amount of the heating medium supplied to the radiators, and control means for said motor, including electric circuits, a thermostat, a contactor, and a device responsive to variations in the heating medium supplied to the radiators, operative to maintain the pressure of the heating medium at the inlet-orifices to the radiators approximately at a predetermined upper pressure or a predetermined lower pressure as selectively determined by the temperature setting of the thermostat and the room temperature.

3. In a heating system of the type described, the combination of a boiler and furnace having ash-pit damper and smoke-pipe check-draft, a plurality of radiators connected by piping to said boiler, and regulating apparatus for said damper and check-draft comprising a motor operatively connected therewith, electric circuits controlling said motor, a thermostat and contactor jointly controlling said electric circuits, and a device responsive to the pressure of the steam within said boiler and piping controlling said contactor, said contactor being normally biased to position to close a given circuit connection and said pressure device being operative on a fall of steam pressure below a predetermined minimum to shift the contactor to open said circuit connection and to close a different circuit connection and on a rise of steam pressure above a predetermined maximum to shift the contactor to open all circuit connections.

4. In a heating system of the type described, the combination of a boiler and furnace having ash-pit damper and smoke-pipe check-draft, a motor operatively connected to said damper and check-draft, and control means for said motor including electric circuits, a thermostat operatively responsive at each temperature setting to at least three different degrees of temperature, a contactor having contact-terminals adapted to effect at least three different circuit arrangements, and a device responsive to the pressure of steam within said boiler, operative to maintain the pressure of steam at the inlet-orifices to the radiators approximately at a predetermined upper pressure or a predetermined lower pressure as selectively determined by the temperature setting of the thermostat and the room temperature, said thermostat and said contactor jointly controlling said electric circuits and said pressure-responsive device controlling said contactor.

5. In a heating system of the type described, the combination of a boiler and furnace having ash-pit damper and smoke-pipe check-draft, a plurality of radiators connected by piping to said boiler, a motor operatively connected with and controlling said damper and check-draft, operative electric circuits for said motor, a temperature-responsive device and a mercury contactor jointly controlling said electric circuits, said temperature-responsive device having at least three contact-carrying fingers and said mercury contactor having at least three contact terminals and three positions of operation two of which positions effect two different circuit connections and the third position breaks all circuit connections, and a device responsive to pressure of the steam within said boiler and piping controlling the positions of operation of said contactor.

6. In a heating system of the type described, the combination of a source of supply of a heating medium, a plurality of radiators connected by piping therewith and provided each with a metering inlet-orifice of a size so proportioned to the size of the radiator as to permit the flow thereto of an amount of the heating medium equal to the full heat transfer capacity of the radiator at a predetermined room temperature and under a predetermined upper pressure and a definite fraction of such maximum amount under a predetermined and much lower pressure, a motor controlling the amount of the heating medium flowing from the supply source to the inlet-orifices to the radiators, and control means for said motor, including electric circuits, a thermostat having at least two sets of contacts and a contactor having at least three contact-terminals jointly controlling said electric circuits, and a pressure-responsive device responsive to variations in the heating medium within the piping to the radiators controlling said contactor, operative to mantain the pressure of the heating medium at the inlet-orifices to the radiators approximately at a predetermined upper pressure or a predetermined lower pressure as selectively determined by the temperature setting of the thermostat and the surrounding room temperature.

7. In a heating system of the type described, the combination of a boiler and furnace having ash-pit damper and smoke-pipe check-draft, a plurality of radiators connected by piping to said boiler and provided each with a metering inlet-orifice of a size so proportioned to the size of the radiator as to permit the flow thereto of an amount of steam equal to the full heat transfer capacity of the radiator at a predetermined room temperature and under a predetermined upper pressure and a definite fraction of such maximum amount under a predetermined and much lower pressure, and means for regulating said damper and check-valve, including a motor operatively connected therewith, electric circuits controlling said motor, a dual-control thermostat and a triple-terminal contactor jointly controlling said electric circuits, and a device responsive to the pressure of steam within said boiler and piping controlling said contactor, said regulating means being operative to maintain approximately either said predetermined upper pressure or predetermined lower pressure of steam at the inlet-orifices to the radiators as selectively determined by the temperature setting of the thermostat and the adjacent room temperature.

WEBSTER TALLMADGE.